(12) United States Patent
Aoki et al.

(10) Patent No.: US 10,766,490 B2
(45) Date of Patent: Sep. 8, 2020

(54) DRIVING ASSISTANCE METHOD AND DRIVING ASSISTANCE APPARATUS

(71) Applicant: Nissan Motor Co., Ltd., Yokohama-shi, Kanagawa (JP)

(72) Inventors: Motonobu Aoki, Kanagawa (JP); Naoki Kojo, Kanagawa (JP); Hiroyuki Takano, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 16/613,634

(22) PCT Filed: May 18, 2017

(86) PCT No.: PCT/JP2017/018609
§ 371 (c)(1),
(2) Date: Nov. 14, 2019

(87) PCT Pub. No.: WO2018/211645
PCT Pub. Date: Nov. 22, 2018

(65) Prior Publication Data
US 2020/0189588 A1    Jun. 18, 2020

(51) Int. Cl.
*G06F 17/00* (2019.01)
*B60W 30/165* (2020.01)
*B60W 50/00* (2006.01)

(52) U.S. Cl.
CPC ..... *B60W 30/165* (2013.01); *B60W 2050/006* (2013.01); *B60W 2530/201* (2020.02); *B60W 2554/802* (2020.02)

(58) Field of Classification Search
CPC ......... B60W 30/165; B60W 2530/201; B60W 2554/802; B60W 2050/006
(Continued)

(56) References Cited

U.S. PATENT DOCUMENTS

2002/0023793 A1* 2/2002 Hattori .................... B60T 7/22
180/169
2004/0176900 A1 9/2004 Yajima
(Continued)

FOREIGN PATENT DOCUMENTS

CN    109789875 A    5/2019
EP    3517381 A1    7/2019
(Continued)

*Primary Examiner* — Ronnie M Mancho
(74) *Attorney, Agent, or Firm* — Young Basile Hanlon & MacFarlane, P.C.

(57) ABSTRACT

A driving assistance method of causing a host vehicle to travel by following a preceding vehicle includes: determining whether the preceding vehicle of the host vehicle is present or absent and, upon determining that the preceding vehicle is present, performing a preceding vehicle type determination of determining whether the preceding vehicle of the host vehicle is a four-wheeler or a two-wheeler; upon the preceding vehicle being a four-wheeler, performing both a control of inter-vehicle distance to the four-wheeler and a route following based on the four-wheeler; and upon the preceding vehicle being a two-wheeler, performing a control of inter-vehicle distance to the two-wheeler without performing a route following based on the two-wheeler.

7 Claims, 10 Drawing Sheets

(58) Field of Classification Search
USPC ........................................................... 701/96
See application file for complete search history.

(56) References Cited

U.S. PATENT DOCUMENTS

2014/0277988 A1* 9/2014 Franganillo ........... B60W 10/02
　　　　　　　　　　　　　　　　　　　　　701/93
2019/0227560 A1　　7/2019 Ueda

FOREIGN PATENT DOCUMENTS

| JP | 2004-265238 A | 9/2004 |
| JP | 2006-38697 A | 2/2006 |
| JP | 2006-44421 A | 2/2006 |
| JP | 2006-88771 A | 4/2006 |

* cited by examiner

DRIVING ASSISTANCE METHOD AND DRIVING ASSISTANCE APPARATUS

TECHNICAL FIELD

The disclosure relates to a driving assistance method and a driving assistance apparatus which causes a host vehicle to travel by following a preceding vehicle.

BACKGROUND

Conventionally, there has been known a driving assistance apparatus for a vehicle which detects a two-wheeler as a preceding vehicle to follow, detects movement in a vehicle width direction, and suppresses acceleration in the following when detecting a car preceding the two-wheeler (see, for example, Japanese Patent Application Publication No. 2004-265238).

SUMMARY

However, the conventional apparatus has a risk that, when the preceding vehicle is a two-wheeler and the route following is performed by following the two-wheeler which laterally moves at a greater amount than a four-wheeler, the behavior of the host vehicle becomes unstable and is greatly disturbed due to lateral movement.

The disclosure has been made by focusing on the aforementioned problem and an object thereof is to provide a driving assistance method and a driving assistance apparatus which suppress lateral movement and make the behavior of a host vehicle stable when a preceding vehicle is a two-wheeler.

In order to achieve the aforementioned object, the disclosure provides a driving assistance method which causes a host vehicle to travel by following a preceding vehicle. The driving assistance method includes: determining whether the preceding vehicle of the host vehicle is present or absent and, upon determining that the preceding vehicle is present, performing a preceding vehicle type determination of determining whether the preceding vehicle of the host vehicle is a four-wheeler or a two-wheeler; upon the preceding vehicle being a four-wheeler, performing both a control of inter-vehicle distance to the four-wheeler and a route following based on the four-wheeler; and upon the preceding vehicle being a two-wheeler, performing a control of inter-vehicle distance to the two-wheeler without performing a route following based on the two-wheeler.

As described above, when the preceding vehicle is a two-wheeler, the control of inter-vehicle distance to the two-wheeler is performed without the route following based on the two-wheeler being performed. This can suppress lateral movement and make the behavior of the host vehicle stable when the preceding vehicle is a two-wheeler.

DETAILED DESCRIPTION

Figure 1:
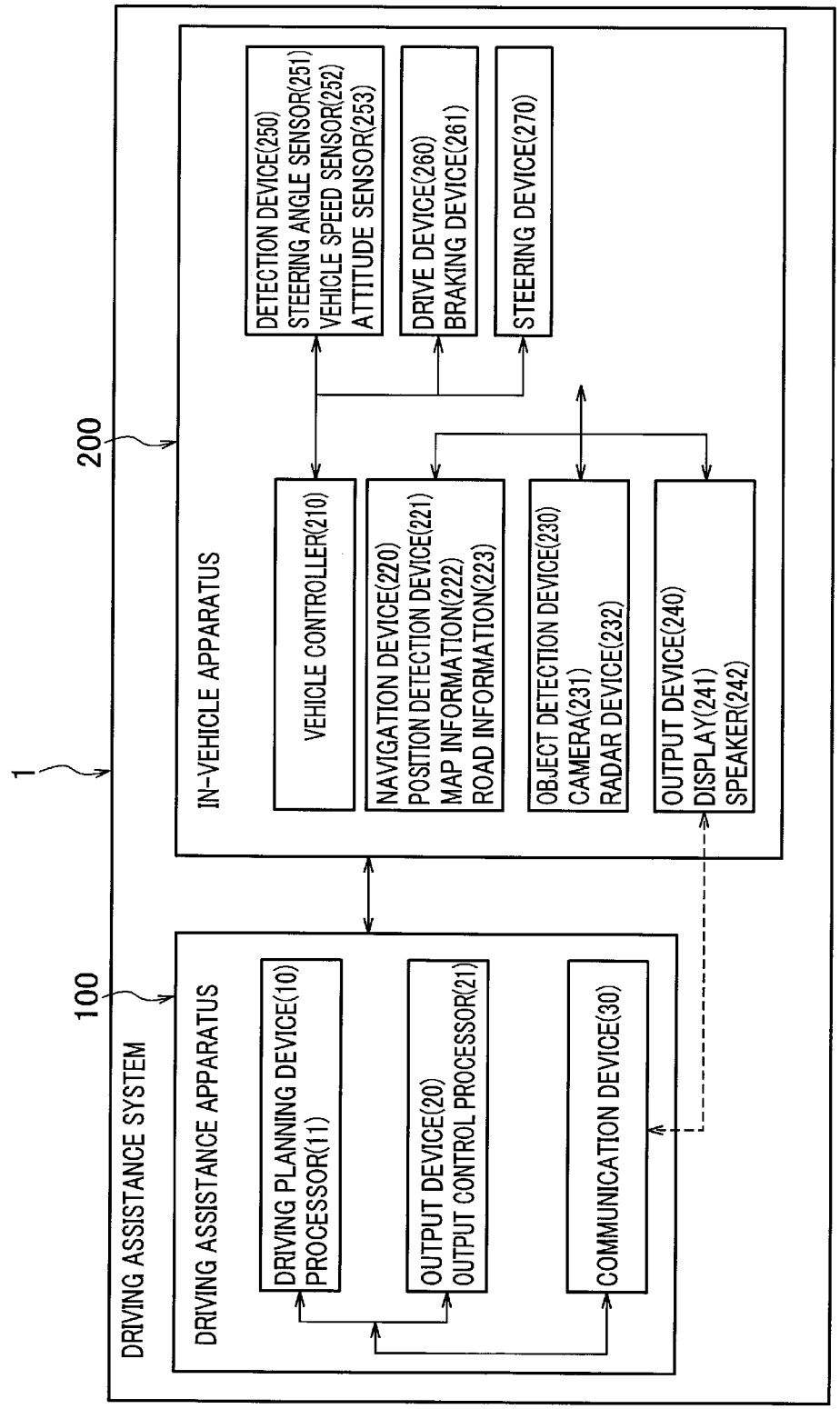
FIG. 1 is a block configuration diagram illustrating a driving assistance system to which a driving assistance method and a driving assistance apparatus of Embodiment 1 are applied.

The best mode for achieving a driving assistance method and a driving assistance apparatus according to the disclosure is described below based on Embodiments 1 to 3 illustrated in the drawings.

Embodiment 1

First, a configuration is described.

The driving assistance method and the driving assistance apparatus in Embodiment 1 are a method and an apparatus applied to an automatic driving vehicle with a driving assistance system which automatically controls steering/driving/braking based on selection of an automatic driving mode. In the following description, the configuration of Embodiment 1 is described in separate sections of "Overall System Configuration," "Detailed Configuration of Driving Planning Device," and "Driving Assistance Control Processing Configuration."

Overall System Configuration

FIG. 1 is a block configuration diagram illustrating a driving assistance system to which the driving assistance method and the driving assistance apparatus of Embodiment 1 are applied. The overall system configuration is described below based on FIG. 1.

As illustrated in FIG. 1, the driving assistance system 1 includes a driving assistance apparatus 100 and an in-vehicle apparatus 200. Note that the driving assistance system 1, the driving assistance apparatus 100, the in-vehicle apparatus 200, and various devices included in these system and apparatuses are computers which include arithmetic processing devices such as CPUs and which execute arithmetic processing.

First, the in-vehicle apparatus 200 is described.

The in-vehicle apparatus 200 includes a vehicle controller 210, a navigation device 220, an object detection device 230, and an output device 240. The devices which form the in-vehicle apparatus 200 are connected to one another by a CAN (Controller Area Network) or another in-vehicle LAN to exchange information with one another. The in-vehicle apparatus 200 can exchange information with the driving assistance apparatus 100 via the in-vehicle LAN.

The vehicle controller 210 is an in-vehicle computer such as an Engine Control Unit (ECU) and electronically controls driving of the vehicle. An electric car including an electric motor as a traveling drive source, an engine car including an internal combustion engine as a traveling drive source, and a hybrid car including both of an electric motor and an internal combustion engine as a traveling drive source can be given as examples of the vehicle. Note that the electric car and the hybrid car which use the electric motor as the traveling drive source also include cars of a type which use a secondary cell as an electric power source of the electric motor and cars of a type which use a fuel cell as the electric power source of the electric motor. Moreover, the vehicle controller 210 causes a detection device 250, a drive device 260, and a steering device 270 to operate.

The detection device 250 includes a steering angle sensor 251, a vehicle speed sensor 252, and an attitude sensor 253. The steering angle sensor 251 detects information such as a steering amount, a steering rate, and a steering acceleration and outputs the information to the vehicle controller 210. The vehicle speed sensor 252 detects the speed and/or acceleration of the vehicle and outputs the speed and/or acceleration to the vehicle controller 210. The attitude sensor 253 detects the position of the vehicle, the pitch angle of the vehicle, the yaw angle of the vehicle, and the roll angle of the vehicle and outputs them to the vehicle controller 210. The attitude sensor 253 includes a gyroscope sensor.

The drive device 260 includes drive mechanisms of the host vehicle. The drive mechanisms include the electric motor and/or the internal combustion engine which is the traveling drive source described above, a power transmission device which include a drive shaft and an automatic transmission which transmit output from the traveling drive source to drive wheels, a braking device 261 which brakes wheels, and the like. The drive device 260 generates control signals for these drive mechanisms based on input signals inputted by an accelerator operation and a brake operation and on control signals obtained from the vehicle controller 210 and the driving assistance apparatus 100 and performs traveling control including acceleration and deceleration of the vehicle. The traveling control including acceleration and deceleration of the vehicle can be automatically performed by sending control information to the drive device 260. Note that, in the hybrid car, distribution of torques to be outputted respectively to the electric motor and the internal combustion engine depending on a traveling condition of the vehicle is also sent to the drive device 260.

The steering device 270 includes a steering actuator. The steering actuator includes a motor attached to a steering column shaft. The steering device 270 executes control of changing a traveling direction of the vehicle based on the control signal obtained from the vehicle controller 210 or the input signal inputted by the steering operation. The vehicle controller 210 sends the control information including the steering amount to the steering device 270 to execute steering control of the host vehicle such that the host vehicle travels along a traveling route. Moreover, the driving assistance apparatus 100 may control a braking amount of each wheel of the vehicle to control the traveling direction of the vehicle. In this case, the vehicle controller 210 sends control information including the braking amount of each wheel to the braking device 261 to control the traveling direction of the vehicle. Note that the control of the drive device 260 and the control of the steering device 270 may be completely automatically performed or performed in a mode of assisting a drive operation (traveling operation) of a driver. The control of the drive device 260 and the control of the steering device 270 can be interrupted or canceled by an intervening operation of the driver. The vehicle controller 210 controls driving of the host vehicle according to a driving plan of a driving planning device 10.

The in-vehicle apparatus 200 includes the navigation device 220, the object detection device 230, and the output device 240.

The navigation device 220 calculates a route from a current position of the host vehicle to a destination. A method based on a graph search theory and known at the time of filing such as the Dijkstra's algorithm or A* can be used as the method of calculating the route. The calculated route is sent to the vehicle controller 210 to be used for host vehicle driving assistance. The calculated route is outputted via the output device 240 as route guidance information. The navigation device 220 includes a position detection device 221, accessible map information 222, and road information 223. Note that the map information 222 and the road information 223 only need to be readable by the navigation device 220 and may be configured to be physically separate from the navigation device 120 or stored in a server readable via a communication device 30 (or a communication device provided in the in-vehicle apparatus 200).

The position detection device 221 includes a Global Positioning System (GPS) and detects a traveling position (latitude, longitude) of the traveling host vehicle.

The map information 222 is a so-called electronic map and is information in which the latitudes and longitudes are associated with map information. The map information 222 includes road information 223 associated with various points.

The road information 223 is defined by nodes and links connecting the nodes. The road information 223 includes information identifying roads based on positions/regions of the roads, road types of the respective roads, road widths of the respective roads, and shape information of the roads. The road information 223 stores the position of an intersection, a direction to enter the intersection, the type of intersection, and other information relating to the intersection in association with identification information of each road link. Moreover, the road information 223 stores the type of road, the road width, the road shape, whether the vehicle is allowed to go straight, a traveling priority relationship, whether overtake is allowed (entrance into an adjacent lane is allowed or not), and other information relating to the road in association with identification information of each road link.

The navigation device 220 determines a traveling route along which the host vehicle travels based on the current position of the host vehicle detected by the position detection device 221. The traveling route is a planned traveling route of the host vehicle and/or a past traveling route of the host vehicle. The traveling route may be a route to a destination specified by the user or a route to a destination estimated based on traveling history of the host vehicle/user. The traveling route along which the host vehicle travels may be determined for each road, for each road in which inbound and outbound directions are specified, or for each lane in which the host vehicle actually travels. The navigation device 220 determines the road links for the respective lanes in the traveling route along which the host vehicle travels by referring to the road information 223 to be described later.

The traveling route includes identification information (coordinate information) of one or multiple points which the host vehicle will pass in the future. The traveling route includes at least one point indicating the next traveling position where the host vehicle is to travel. The traveling route may be formed of continuous lines or discrete points. The traveling route is identified by a road identifier, a lane identifier, and a link identifier, though not limited to this configuration. These road identifier, lane identifier, and link identifier are defined in the map information 222 and the road information 223.

The object detection device 230 is a device which detects a condition around the host vehicle and detects presence of objects including obstacles present around the host vehicle and the positions where these objects are present. The object detection device 230 includes a camera 231 and a radar device 232, though not limited to this configuration.

The camera 231 is an imaging device including an imaging element such as, for example, a CCD and may be an infrared camera or a stereo camera. The camera 231 is installed at a predetermined position in the host vehicle and captures images of objects in an area around the host vehicle. The area around the host vehicle includes the front, rear, left, and right sides of the host vehicle. The objects include two-dimensional signs such as a stop line drawn on a road surface. The objects include three-dimensional objects. The objects include stationary objects such as a road sign. The objects include moving objects such as a pedestrian, a two-wheeler, and a four-wheeler (other vehicle). The objects include road structures such as a guard rail, a median strip, and a curb.

The object detection device 230 analyzes image data and identifies the type of each object based on the result of this analysis. The object detection device 230 determines whether each of the objects included in the image data is a vehicle, a pedestrian, or a road sign by using a pattern matching technique and the like. The object detection device 230 processes the obtained image data and obtains distance from the host vehicle to each of the objects present around the host vehicle, based on the position of the object. Particularly, the object detection device 230 obtains a positional relationship between each object and the host vehicle.

A radar such as a millimeter-wave radar, a laser radar, an ultrasonic radar, or a laser range finder using a method known at the time of filing can be used as the radar device 232. The object detection device 230 detects presence of an object, the position of the object, and the distance to the object based on a reception signal of the radar device 232. The object detection device 230 detects presence of an object, the position of the object, and the distance to the object based on a clustering result of point cloud information obtained by the laser radar.

The output device 240 includes a display 241 and a speaker 242. The output device 240 outputs various types of information relating to driving assistance to the user or an occupant of a vehicle in the area around the host vehicle. The output device 240 outputs information relating to a prepared driving action plan and traveling control based on the driving action plan. The output device 240 notifies the occupant of the host vehicle of execution of the steering operation and the acceleration and deceleration in advance via the display 241 and the speaker 242 as information depending on the control information used to cause the host vehicle to travel along the traveling route (target route). Moreover, the output device 240 may notify the occupant of the host vehicle or the occupant of the other vehicle of the information relating to the driving assistance in advance via a lamp outside the vehicle cabin or a lamp inside the vehicle cabin. Furthermore, the output device 240 may output the various types of information relating to the driving assistance to an external apparatus such as an intelligent transport system via the communication device. Moreover, when the traveling route is corrected, the output device may output information on correction of the traveling route and the corrected traveling route.

Next, the driving assistance apparatus 100 is described. As illustrated in FIG. 1, the driving assistance apparatus 100 includes the driving planning device 10, an output device 20, and the communication device 30.

The driving planning device 10 includes a processor 11 which functions as a control device of the driving planning device 10. Specifically, the processor 11 is a computer including: a ROM (Read Only Memory) which stores a program for executing preceding vehicle presence-absence determination processing, inter-vehicle distance control processing, preceding vehicle route following processing, preceding vehicle route obtaining processing, and route following control processing; a CPU (Central Processing Unit) which is an operation circuit configured to function as the driving planning device 10 by executing the program stored in the ROM; and a RAM (Random Access Memory) which functions as an accessible storage device. In other words, the processor 11 has a function of performing the preceding vehicle presence-absence determination processing, preceding vehicle type determination processing, the inter-vehicle distance control processing, and preceding vehicle route following processing.

The output device 20 has a function similar to the output device 240 of the in-vehicle apparatus 200 described above. The display 241 and the speaker 242 are used as the configurations of the output device 20. The driving planning device 10 and the output device 20 can exchange information via a wired or wireless communication line.

The communication device 30 exchanges information with the in-vehicle apparatus 200, exchanges information in the driving assistance apparatus 100, and exchanges information with the outside of the driving assistance system 1.

Detailed Configuration of Driving Planning Device

Figure 2:
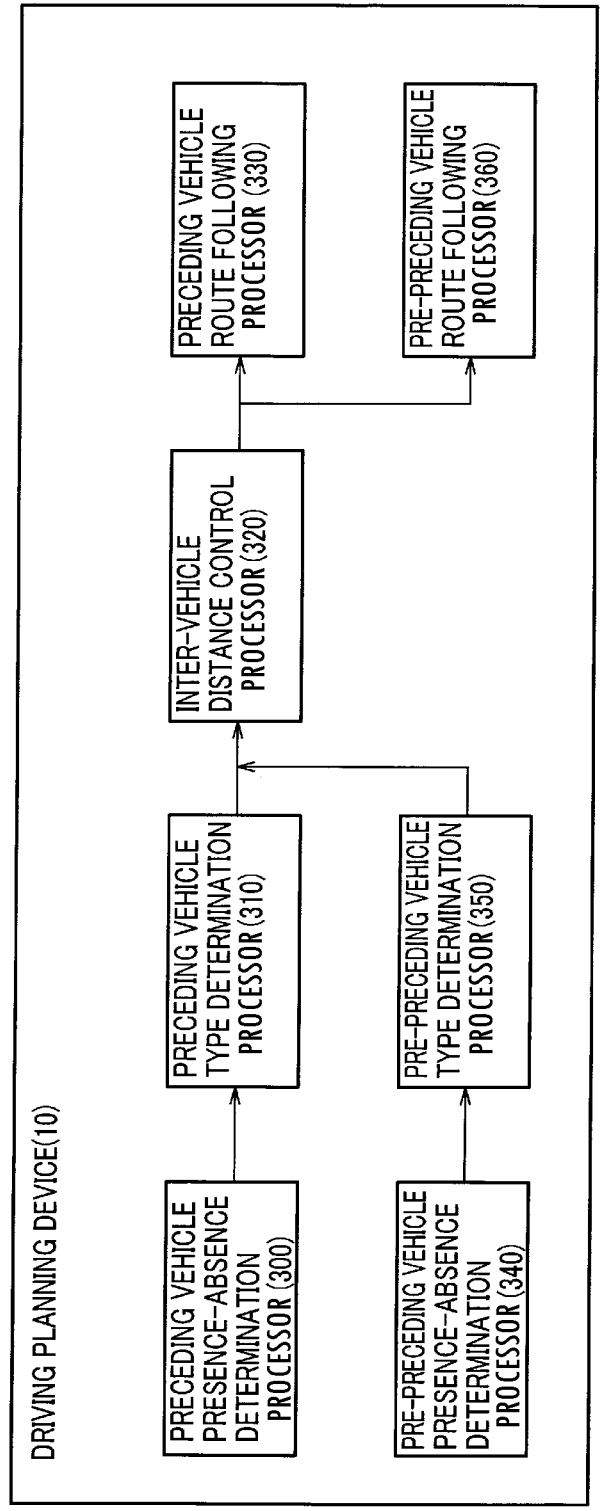
FIG. 2 is a block configuration diagram illustrating various types of control processing in a processor of a driving planning device included in the driving assistance apparatus of Embodiment 1.

FIG. 2 is a block configuration diagram illustrating various types of control processing in the processor 11 of the driving planning device 10 included in the driving assistance apparatus 100 of Embodiment 1. A detailed configuration of the driving planning device 10 is described below based on FIG. 2. Note that the various types of control processing in the processor 11 can be applied not only to a road with one lane on each side but to other road environments such as a road with two lanes on each side.

As illustrated in FIG. 2, the driving planning device 10 includes a preceding vehicle presence-absence determination processor 300, a preceding vehicle type determination processor 310, an inter-vehicle distance control processor 320, a preceding vehicle route following processor 330, a pre-preceding vehicle presence-absence determination processor 340, a pre-preceding vehicle type determination processor 350, and a pre-preceding vehicle route following processor 360.

The preceding vehicle presence-absence determination processor 300 determines whether a preceding vehicle is present or absent. The preceding vehicle presence-absence determination processor 300 determines whether the preceding vehicle is present or absent by determining whether a vehicle is present or absent in front of a host vehicle 1A in the same lane as the host vehicle 1A on the map data. Note that, although a specific processing method of the preceding vehicle presence-absence determination processing is not described in detail, for example, a determination method known at the time of filing can be used. In Embodiment 1, a two-wheeler 1B is detected as the preceding vehicle (see FIGS. 4 and 5). When the preceding vehicle presence-absence determination processor 300 determines that the preceding vehicle is present, the preceding vehicle type determination processing is performed.

The preceding vehicle type determination processor 310 determines whether the preceding vehicle is a four-wheeler or a two-wheeler. The type of the preceding vehicle is determined by using an image recognition technique. Although not described in detail, for example, a method of determining the type of an object known at the time of filing can be used. In Embodiment 1, a two-wheeler is detected as the preceding vehicle. When the preceding vehicle is determined to be a two-wheeler as in Embodiment 1, the inter-vehicle distance control processing is performed. Meanwhile, when the preceding vehicle is determined to be a four-wheeler, the inter-vehicle distance control processing and the preceding vehicle route following processing are performed.

The inter-vehicle distance control processor 320 performs control of inter-vehicle distance. In the control of inter-vehicle distance, control is performed such that an inter-vehicle distance d is constant. The inter-vehicle distance d can be expressed as $$d=(A/T1)+(B/T2)$$

by using constants A and B, T1 (THW: Time Head Way), and T2 (TTC: Time to Collision). A method known at the time of the filing of the application can be appropriately used for this processing.

The preceding vehicle route following processor 330 performs the route following based on the preceding vehicle. A route of the preceding vehicle is obtained by projecting a trajectory of the preceding vehicle tracked by using a stereo camera, a LIDAR, or a RADER on the map data and obtaining this trajectory as a route along which the preceding vehicle has traveled. Then, the preceding vehicle route following processor 330 performs control processing of following the route of the preceding vehicle. Although not described in detail, for example, a method of following a route of a preceding vehicle known at the time of filing can be used.

The pre-preceding vehicle presence-absence determination processor 340 determines whether a vehicle in front of the preceding vehicle (hereafter, referred to as pre-preceding vehicle) is present or absent. The pre-preceding vehicle presence-absence determination processor 340 determines whether the pre-preceding vehicle is present or absent by determining whether a vehicle is present or absent in front of the preceding vehicle in the same lane as the preceding vehicle on the map data, the preceding vehicle in the same lane as the host vehicle 1A.

The pre-preceding vehicle type determination processor 350 determines whether the pre-preceding vehicle traveling in front of the preceding vehicle is a four-wheeler or a two-wheeler. The type of the pre-preceding vehicle is determined by using an image recognition technique. Although not described in detail, for example, a method of determining the type of an object known at the time of filing can be used. When the pre-preceding vehicle is determined to be a four-wheeler in Embodiment 1, the inter-vehicle distance control processing and the pre-preceding vehicle route following processing are performed.

The pre-preceding vehicle route following processor 360 performs route following based on the pre-preceding vehicle. The method of the route following is similar to the method performed by the preceding vehicle route following processor 330.

Driving Assistance Control Processing Configuration

Figure 3:
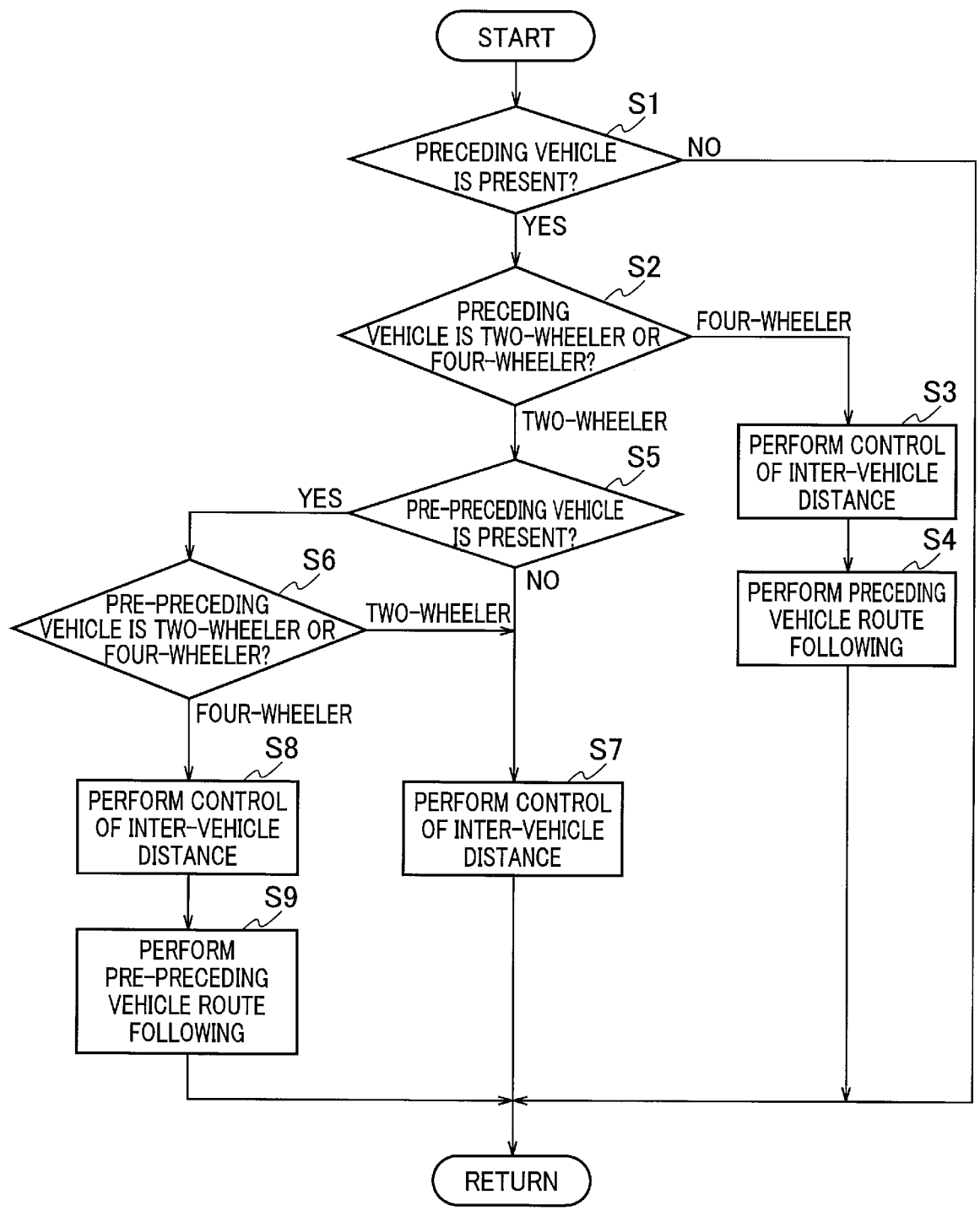
FIG. 3 is a flowchart illustrating a driving assistance control processing flow executed by the processor of the driving planning device included in the driving assistance apparatus of Embodiment 1.

FIG. 3 illustrates a driving assistance control processing flow executed by the processor 11 of the driving planning device 10 included in the driving assistance apparatus 100 of Embodiment 1. Steps of FIG. 3 indicating the driving assistance control processing configuration are described below.

In step S1, the processor 11 determines whether a preceding vehicle is present or absent. In the case of YES (preceding vehicle is present), the flow proceeds to step S2. In the case of NO (preceding vehicle is absent), the flow proceeds to return.

In step S2, following the determination that a preceding vehicle is present in step S1, the processor 11 determines whether the preceding vehicle is a two-wheeler or a four-wheeler. When the preceding vehicle is a four-wheeler, the flow proceeds to step S3. When the preceding vehicle is a two-wheeler, the flow proceeds to step S5.

In step S3, following the determination that the preceding vehicle is a four-wheeler in step S2, the processor 11 performs control of inter-vehicle distance to the preceding vehicle (four-wheeler) and the flow proceeds to step S4.

In step S4, following the control of inter-vehicle distance in step S3, the processor 11 performs preceding vehicle route following based on the preceding vehicle (four-wheeler) and the flow proceeds to return.

In step S5, following the determination that the preceding vehicle is a two-wheeler in step S2, the processor 11 determines whether a pre-preceding vehicle is present or absent. In the case of YES (pre-preceding vehicle is present), the flow proceeds to step S6. In the case of NO (pre-preceding vehicle is absent), the flow proceeds to step S7.

In step S6, following the determination that a pre-preceding vehicle is present in step S5, the processor 11 determines whether the pre-preceding vehicle is a two-wheeler or a four-wheeler. When the pre-preceding vehicle is a four-wheeler, the flow proceeds to step S8. When the pre-preceding vehicle is a two-wheeler, the flow proceeds to step S7.

In step S7, following the determination that the pre-preceding vehicle is absent in step S5 or the determination that the pre-preceding vehicle is a two-wheeler in step S6, the processor 11 performs the control of inter-vehicle distance and the flow proceeds to return.

In step S8, following the determination that the pre-preceding vehicle is a four-wheeler in step S6, the processor 11 performs the control of inter-vehicle distance to the preceding vehicle (two-wheeler) and the flow proceeds to step S9.

In step S9, following the control of inter-vehicle distance in step S8, the processor 11 performs the pre-preceding vehicle route following based on the per-preceding vehicle (four-wheeler) and the flow proceeds to return.

Next, operations are described.

Operations of Embodiment 1 are described in separate sections of "Driving Assistance Control Operation" and "Characteristic Operation of Driving Assistance Control."

Driving Assistance Control Operation

The driving assistance control operation of Embodiment 1 is described below based on FIGS. 3 to 5.

When the preceding vehicle of the host vehicle is a four-wheeler, in the flowchart of FIG. 3, a flow from step S1 to step S2, to step S3, to step S4, and then to return is repeated. Specifically, the control of inter-vehicle distance is performed in step S3 and the preceding vehicle route following is performed in step S4. As described above, when the preceding vehicle is a four-wheeler, the route following based on the four-wheeler which is the preceding vehicle and the control of inter-vehicle distance to the four-wheeler are performed.

When the preceding vehicle of the host vehicle is a two-wheeler and the pre-preceding vehicle is absent, in the flowchart of FIG. 3, a flow from step S1 to step S2, to step S5, to step S7, and then to return is repeated. Moreover, when the preceding vehicle of the host vehicle is a two-wheeler and the pre-preceding vehicle is also a two-wheeler, in the flowchart of FIG. 3, a flow from step S1 to step S2, to step S5, to step S6, to step S7, and then to return is repeated. In both cases, in step S7, only the control of inter-vehicle distance is performed without the route following based on the two-wheeler being performed. As described above, when the preceding vehicle of the host vehicle 1A is the two-wheeler 1B, as illustrated in FIG. 4, only the control of inter-vehicle distance to the two-wheeler 1B which is the preceding vehicle is performed without the route following based on the two-wheeler 1B which is the preceding vehicle being performed. Similarly, when the preceding vehicle of the host vehicle is a two-wheeler and the pre-preceding vehicle is also a two-wheeler, only the control of inter-vehicle distance to the two-wheeler 1B which is the preceding vehicle is performed without the route following based on the two-wheeler 1B which is the preceding vehicle being performed. Note that traveling lane information of the host vehicle 1A and the two-wheeler 1B is obtained from the map information 222.

Meanwhile, when the preceding vehicle of the host vehicle is a two-wheeler but the pre-preceding vehicle is a four-wheeler, in the flowchart of FIG. 3, a flow from step S1 to step S2, to step S5, to step S6, to step S8, to step S9, and then to return is repeated. Specifically, the control of inter-vehicle distance to the preceding vehicle (two-wheeler) is performed in step S8 and the pre-preceding vehicle route following based on the pre-preceding vehicle (four-wheeler) is performed in step S9. As described above, when the preceding vehicle is the two-wheeler 1B but the pre-preceding vehicle is the four-wheeler IC, as illustrated in FIG. 5, the control of inter-vehicle distance to the two-wheeler 1B which is the preceding vehicle and the route following based on the four-wheeler IC which is the pre-preceding vehicle are performed. Note that the traveling lane information of the host vehicle 1A, the two-wheeler 1B, and the four-wheeler IC is obtained from the map information 222.

Characteristic Operation of Driving Assistance Control

In Embodiment 1, whether the preceding vehicle of the host vehicle is present or absent is determined. When the preceding vehicle is determined to be present, the preceding vehicle type determination of determining whether the preceding vehicle of the host vehicle is a four-wheeler or a two-wheeler is performed. When the preceding vehicle is a four-wheeler, both of the control of inter-vehicle distance to the four-wheeler and the route following based on the four-wheeler are performed. When the preceding vehicle is a two-wheeler, the control of inter-vehicle distance to the two-wheeler is performed without the route following based on the two-wheeler being performed.

For example, assume a case where, when a preceding vehicle is present during traveling in automatic driving, both of the control of inter-vehicle distance and the route following based on the four-wheeler are performed without the type of the preceding vehicle being determined. In this case, when the preceding vehicle is a two-wheeler, the host vehicle moves in a lateral direction by following the lateral movement of the two-wheeler and the behavior of the host vehicle becomes unstable.

Thus, when a preceding vehicle is present during traveling in automatic driving, the type of the preceding vehicle is determined and the control for the preceding vehicle is changed depending on whether the preceding vehicle is a four-wheeler or a two-wheeler. Specifically, when the preceding vehicle is a four-wheeler with small lateral movement, both of the control of inter-vehicle distance and the route following based on the four-wheeler are performed. Meanwhile, when the preceding vehicle is a two-wheeler with large lateral movement, the control of inter-vehicle distance to the two-wheeler is performed without the route following based on the two-wheeler being performed. Accordingly, when the preceding vehicle is a two-wheeler, it is possible to suppress lateral movement and make the behavior of the host vehicle stable.

In Embodiment 1, whether the pre-preceding vehicle of the host vehicle is present or absent is determined. When the pre-preceding vehicle is determined to be present, the pre-preceding vehicle type determination of determining whether the pre-preceding vehicle of the host vehicle is a four-wheeler or a two-wheeler is performed. When the preceding vehicle is a two-wheeler and the pre-preceding vehicle is a four-wheeler, the pre-preceding vehicle route following of following the route of the four-wheeler which is the pre-preceding vehicle is performed without the route following based on the two-wheeler being performed.

For example, when the preceding vehicle is a two-wheeler and the route following based on the two-wheeler is not performed, the route of the host vehicle needs to be determined by using another method.

Meanwhile, performing the pre-preceding vehicle route following by utilizing a four-wheeler which is the pre-preceding vehicle when the pre-preceding vehicle is a four-wheeler eliminates the need for determining the route of the host vehicle by another method.

Accordingly, when the pre-preceding vehicle is a four-wheeler, it is possible to suppress lateral movement and make the behavior of the host vehicle stable by using a simple method which is the pre-preceding vehicle route following.

Next, effects are described.

The effects described below can be obtained by the driving assistance method and the driving assistance apparatus in Embodiment 1.

(1) In the driving assistance method of causing the host vehicle to travel by following the preceding vehicle, whether the preceding vehicle of the host vehicle is present or absent is determined and, when the preceding vehicle is determined to be present, the preceding vehicle type determination of determining whether the preceding vehicle of the host vehicle is a four-wheeler or a two-wheeler is performed. When the preceding vehicle is a four-wheeler, both of the control of inter-vehicle distance to the four-wheeler and the route following based on the four-wheeler are performed.

Figure 4:
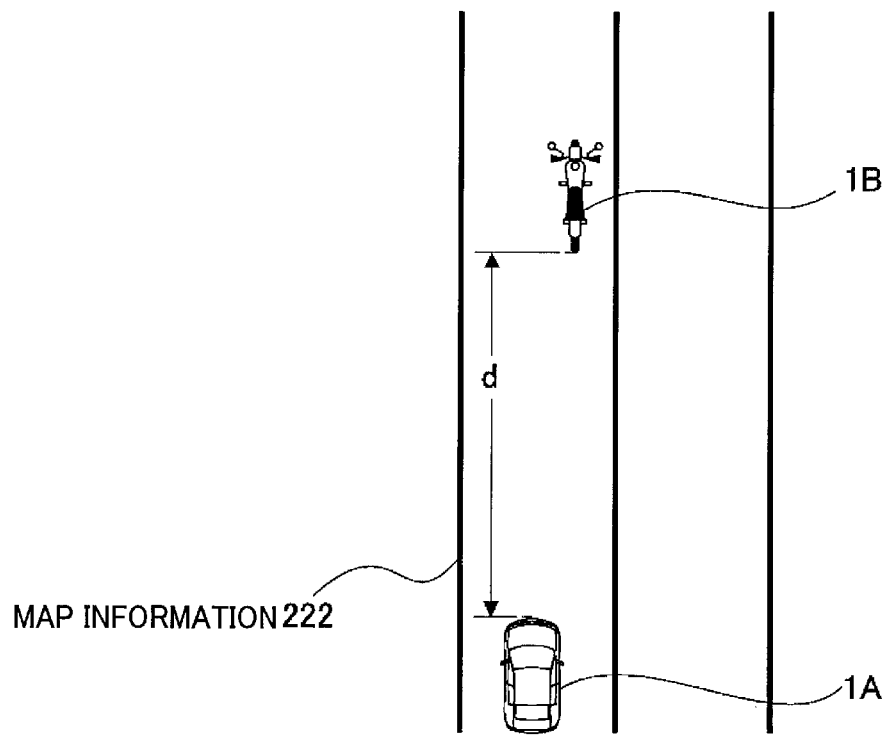
FIG. 4 is an operation explanatory view giving an example of the case where the driving assistance apparatus of Embodiment 1 causes the host vehicle to travel on a road with one lane on each side in which the pre-preceding vehicle is absent and the preceding vehicle is a two-wheeler.
Figure 5:
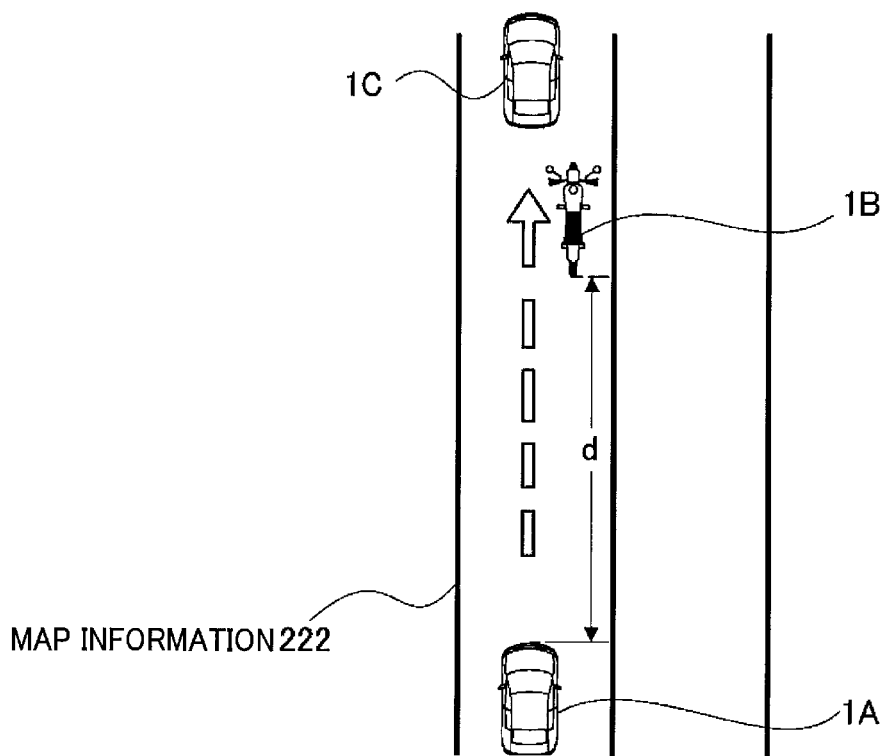
FIG. 5 is an operation explanatory view giving an example of the case where the driving assistance apparatus of Embodiment 1 causes the host vehicle to travel on a road with one lane on each side in which the pre-preceding vehicle is a four-wheeler and the preceding vehicle is a two-wheeler.

When the preceding vehicle is a two-wheeler, the control of inter-vehicle distance to the two-wheeler is performed without the route following based on the two-wheeler being performed (FIG. 4).

Accordingly, it is possible to provide the driving assistance method which suppresses lateral movement and makes the behavior of the host vehicle stable when the preceding vehicle is a two-wheeler.

(2) Whether the pre-preceding vehicle of the host vehicle is present or absent is determined and, when the pre-preceding vehicle is determined to be present, the pre-preceding vehicle type determination of determining whether the pre-preceding vehicle of the host vehicle is a four-wheeler or a two-wheeler is performed.
When the preceding vehicle is a two-wheeler and the pre-preceding vehicle is a four-wheeler, the pre-preceding vehicle route following of following the route of the four-wheeler which is the pre-preceding vehicle is performed without the route following based on the two-wheeler being performed (FIG. 5).

Accordingly, in addition to the effect (1), when the pre-preceding vehicle is a four-wheeler, it is possible to suppress lateral movement and make the behavior of the host vehicle stable by using a simple method which is the pre-preceding vehicle route following.

(3) The driving assistance apparatus includes a vehicle controller (driving planning device 10 and processor 11) which performs the control of inter-vehicle distance between the host vehicle and the preceding vehicle and the preceding vehicle route following control.

In this driving assistance apparatus, the vehicle controller (driving planning device 10 and processor 11) includes the preceding vehicle presence-absence determination processor 300 which determines whether the preceding vehicle of the host vehicle is present or absent and the preceding vehicle type determination processor 310 which performs the preceding vehicle type determination of determining whether the preceding vehicle of the host vehicle is a four-wheeler or a two-wheeler when the preceding vehicle is determined to be present.

When the preceding vehicle is a four-wheeler, the driving assistance apparatus performs both of the control of inter-vehicle distance to the four-wheeler and the route following based on the four-wheeler.

When the preceding vehicle is a two-wheeler, the driving assistance apparatus performs the control of inter-vehicle distance to the two-wheeler without performing the route following based on the two-wheeler (FIG. 2).

Accordingly, it is possible to provide the driving assistance apparatus which suppresses lateral movement and makes the behavior of the host vehicle stable when the preceding vehicle is a two-wheeler.

Embodiment 2

Embodiment 2 is an example in which, when the preceding vehicle is a two-wheeler, lane following of following a planned traveling route obtained from a result of lane recognition is performed without the route following based on the two-wheeler being performed.

First, the configuration of Embodiment 2 is described in separate sections of "Detailed Configuration of Driving Planning Device" and "Driving Assistance Control Processing Configuration." Note that, since the "Overall System Configuration" in Embodiment 2 is the same as that in FIG. 1 of Embodiment 1, the illustration and description thereof are omitted.

Detailed Configuration of Driving Planning Device

Figure 6:
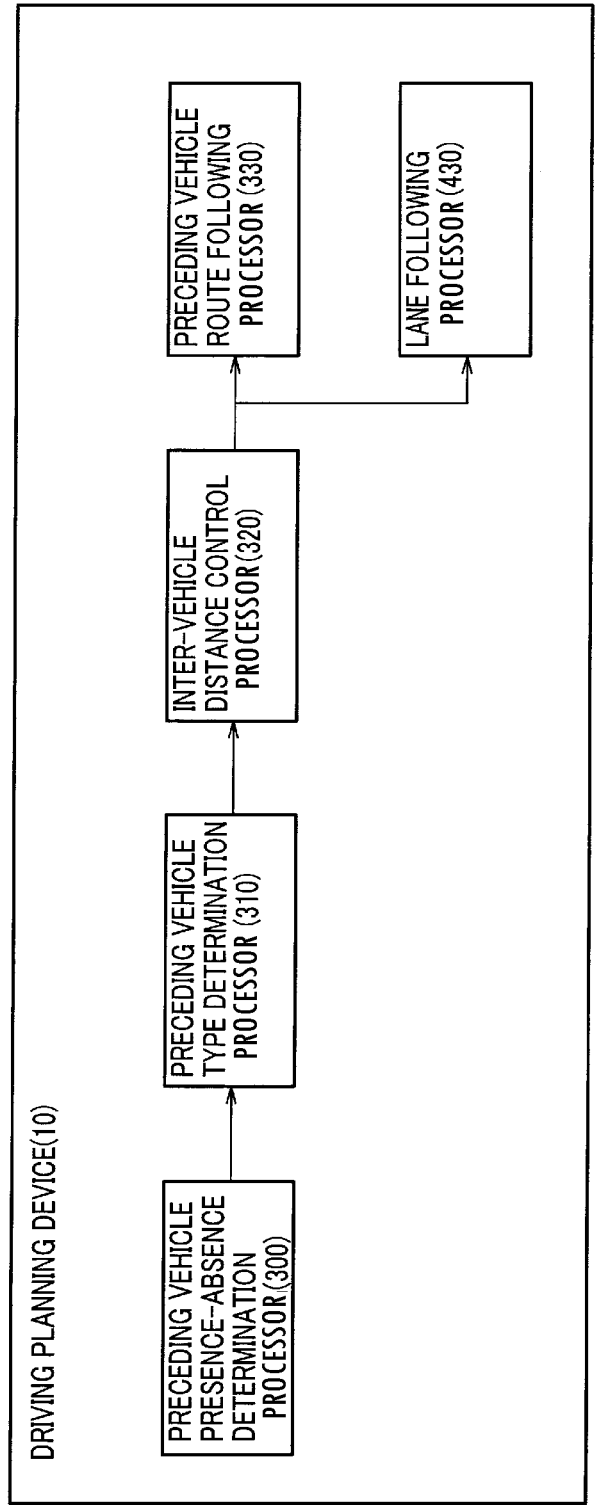
FIG. 6 is a block configuration diagram illustrating various types of control processing in a processor of a driving planning device included in a driving assistance apparatus of Embodiment 2.

FIG. 6 is a block configuration diagram illustrating various types of control processing in the processor 11 of the driving planning device 10 included in the driving assistance apparatus 100 of Embodiment 2. A detailed configuration of the driving planning device 10 is described below based on FIG. 6. Note that the various types of control processing in the processor 11 can be applied not only to a road with one lane on each side but to other road environments such as a road with two lanes on each side.

As illustrated in FIG. 6, the driving planning device 10 includes the preceding vehicle presence-absence determination processor 300, the preceding vehicle type determination processor 310, the inter-vehicle distance control processor 320, the preceding vehicle route following processor 330, and a lane following processor 430. Note that, since the preceding vehicle presence-absence determination processor 300, the preceding vehicle type determination processor 310, the inter-vehicle distance control processor 320, and the preceding vehicle route following processor 330 are the same as those in Embodiment 1, description thereof are omitted.

Figure 8:
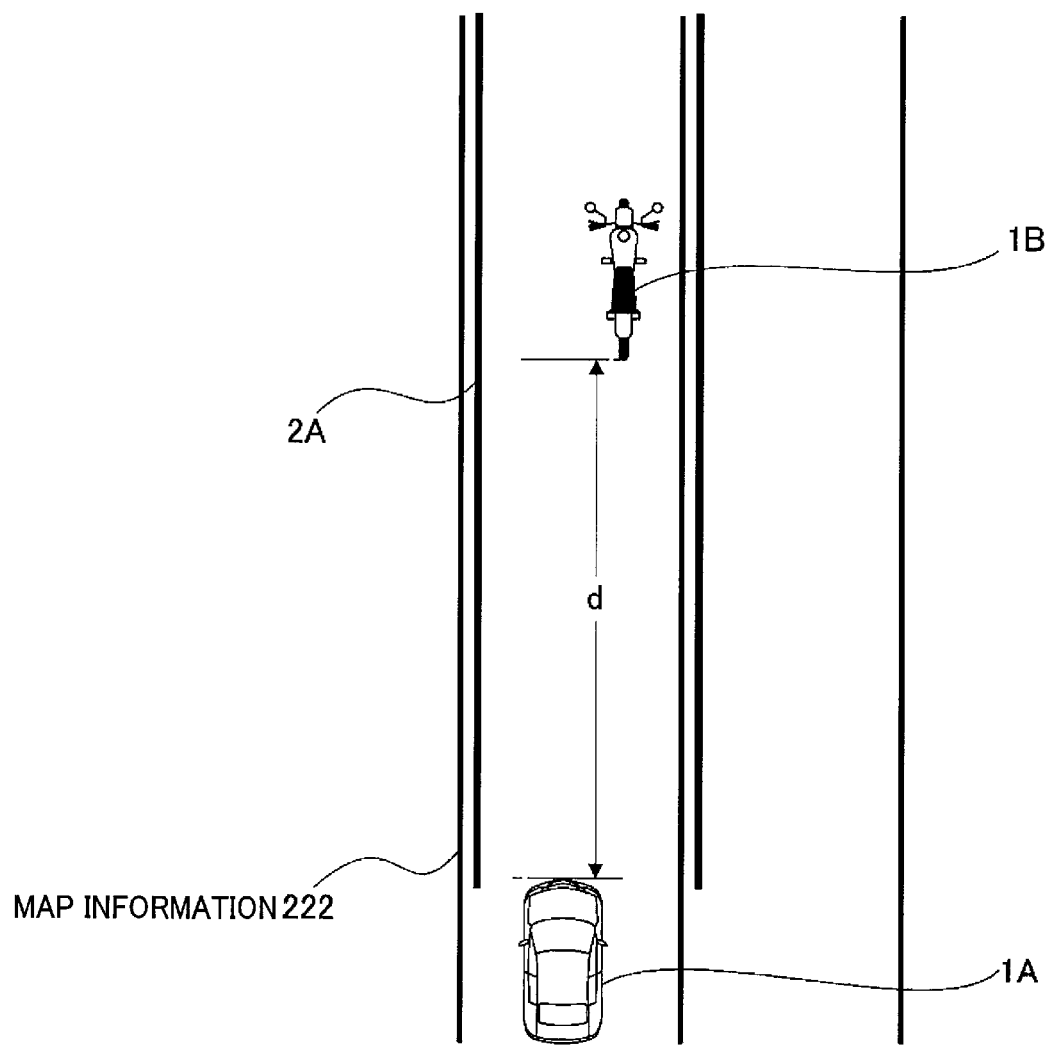
FIG. 8 is an operation explanatory view giving an example of the case where the driving assistance apparatus in Embodiment 2 causes the host vehicle to travel on a road with one lane on each side in which the preceding vehicle is a two-wheeler.

The lane following processor 430 recognizes a lane in which the host vehicle travels by using white line information or road boundary information recognized by using a stereo camera, a LIDAR, or a RADER. In Embodiment 2, as illustrated in FIG. 8, a lane 2A is detected. Then, control processing of traveling inside of the lane 2A is performed. Although not described in detail, for example, a lane following method known at the time of filing can be used.

Driving Assistance Control Processing Configuration

Figure 7:
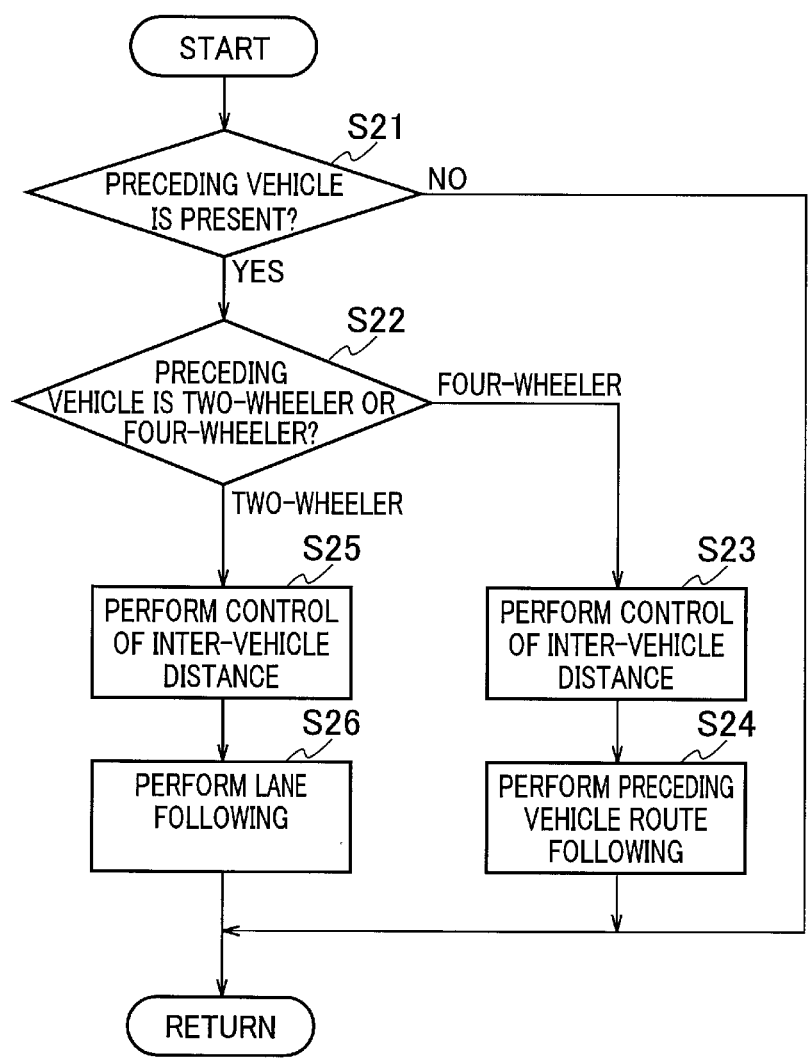
FIG. 7 is a flowchart illustrating a driving assistance control processing flow executed by the processor of the driving planning device included in the driving assistance apparatus of Embodiment 2.

FIG. 7 illustrates a driving assistance control processing flow executed by the processor 11 of the driving planning device 10 included in the driving assistance apparatus 100 of Embodiment 2. Steps of FIG. 7 indicating the driving assistance control processing configuration are described below.

In step S21, the processor 11 determines whether a preceding vehicle is present or absent. In the case of YES (preceding vehicle is present), the flow proceeds to step S22. In the case of NO (preceding vehicle is absent), the flow proceeds to return.

In step S22, following the determination that a preceding vehicle is present in step S21, the processor 11 determines whether the preceding vehicle is a two-wheeler or a four-wheeler. When the preceding vehicle is a four-wheeler, the flow proceeds to step S23. When the preceding vehicle is a two-wheeler, the flow proceeds to step S25.

In step S23, following the determination that the preceding vehicle is a four-wheeler in step S22, the processor 11 performs the control of inter-vehicle distance to the preceding vehicle (four-wheeler) and the flow proceeds to step S24.

In step S24, following the control of inter-vehicle distance in step S23, the processor 11 performs the preceding vehicle route following based on the preceding vehicle (four-wheeler) and the flow proceeds to return.

In step S25, following the determination that the preceding vehicle is a two-wheeler in step S22, the processor 11 performs the control of inter-vehicle distance between the host vehicle and the two-wheeler and the flow proceeds to step S26.

In step S26, following the control of inter-vehicle distance in step S25, the processor 11 performs the lane following of following the planned traveling route obtained from the result of the lane recognition and the flow proceeds to return.

Next, the driving assistance control operation of Embodiment 2 is described.

The driving assistance control operation is described below based on FIGS. 7 and 8.

When the preceding vehicle of the host vehicle is a four-wheeler, in the flowchart of FIG. 7, a flow from step S21 to step S22, to step S23, to step S24, and then to return is repeated. Specifically, the control of inter-vehicle distance is performed in step S23 and the preceding vehicle route following is performed in step S24. As described above, when the preceding vehicle is a four-wheeler, the route following based on the four-wheeler which is the preceding vehicle and the control of inter-vehicle distance to the four-wheeler are performed.

When the preceding vehicle of the host vehicle is a two-wheeler, in the flowchart of FIG. 7, a flow from step S21 to step S22, to step S25, to step S26, and then to return is repeated. Specifically, the control of inter-vehicle distance is performed in step S25 and the lane following is performed in step S26. As described above, when the preceding vehicle of the host vehicle 1A is the two-wheeler 1B, as illustrated in FIG. 8, the lane following of following the planned traveling route obtained from the result of the lane recognition is performed without the route following based on the two-wheeler 1B which is the preceding vehicle being performed. Note that the information on the lane 2A in which the host vehicle 1A and the two-wheeler 1B travel is obtained from the map information 222.

As described above, in Embodiment 2, when the preceding vehicle is the two-wheeler 1B with large lateral movement, there are performed the control of inter-vehicle distance to the two-wheeler 1B and the lane following of traveling the planned traveling route (for example, a route at the center position of the traveling lane) set in the traveling lane of the host vehicle 1A along the lane 2A, without the route following based on the two-wheeler 1B being performed. Accordingly, determining the traveling route of the host vehicle by the lane following when the preceding vehicle is a two-wheeler suppresses lateral movement and makes the behavior of the host vehicle stable.

Next, effects are described.

The effects described below can be obtained by the driving assistance method and the driving assistance apparatus in Embodiment 2.

(4) When the preceding vehicle is a two-wheeler, there are performed the control of inter-vehicle distance to the two-wheeler and the lane following of following the planned traveling route obtained from the result of the lane recognition without the route following based on the two-wheeler being performed (FIG. 8).

Accordingly, in addition to the effect (1) or (2) described above, when the preceding vehicle is a two-wheeler, determining the traveling route of the host vehicle by the lane following can suppress lateral movement and make the behavior of the host vehicle stable.

Embodiment 3

Embodiment 3 is an example in which, when the preceding vehicle is a two-wheeler, interpolated lane following of following an interpolated lane generated based on the planned traveling route obtained from the result of the lane recognition is performed without the route following based on the two-wheeler being performed.

First, the configuration of Embodiment 3 is described in separate sections of "Detailed Configuration of Driving Planning Device" and "Driving Assistance Control Processing Configuration." Note that, since the "Overall System Configuration" in Embodiment 3 is the same as that in FIG. 1 of Embodiment 1, the illustration and description thereof are omitted.

Detailed Configuration of Driving Planning Device

Figure 9:
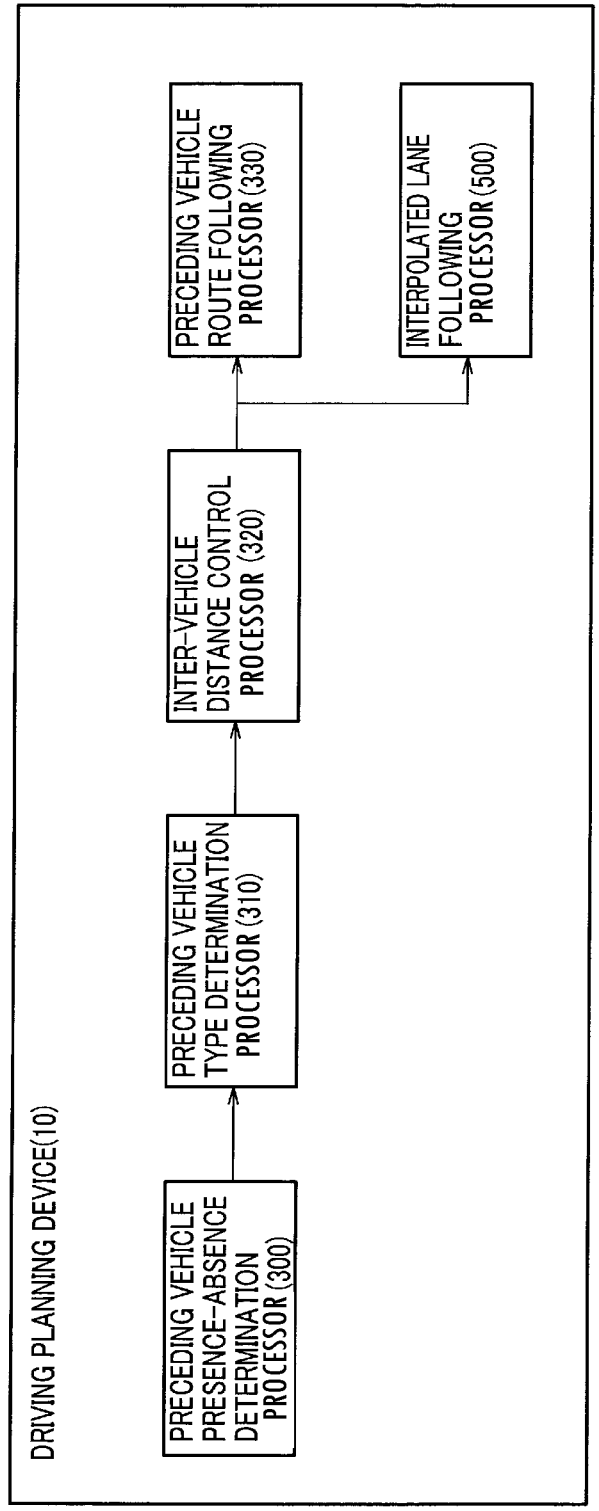
FIG. 9 is a block configuration diagram illustrating various types of control processing in a processor of a driving planning device included in a driving assistance apparatus of Embodiment 3.

FIG. 9 is a block configuration diagram illustrating various types of control processing in the processor 11 of the driving planning device 10 included in the driving assistance apparatus 100 of Embodiment 3. A detailed configuration of the driving planning device 10 is described below based on FIG. 9. Note that the various types of control processing in the processor 11 can be applied not only to a road with one lane on each side but to other road environments such as a road with two lanes on each side.

As illustrated in FIG. 9, the driving planning device 10 includes the preceding vehicle presence-absence determination processor 300, the preceding vehicle type determination processor 310, the inter-vehicle distance control processor 320, the preceding vehicle route following processor 330, and an interpolated lane following processor 500. Note that, since the preceding vehicle presence-absence determination processor 300, the preceding vehicle type determination processor 310, the inter-vehicle distance control processor 320, and the preceding vehicle route following processor 330 are the same as those in Embodiment 1, description thereof are omitted.

Figure 11:
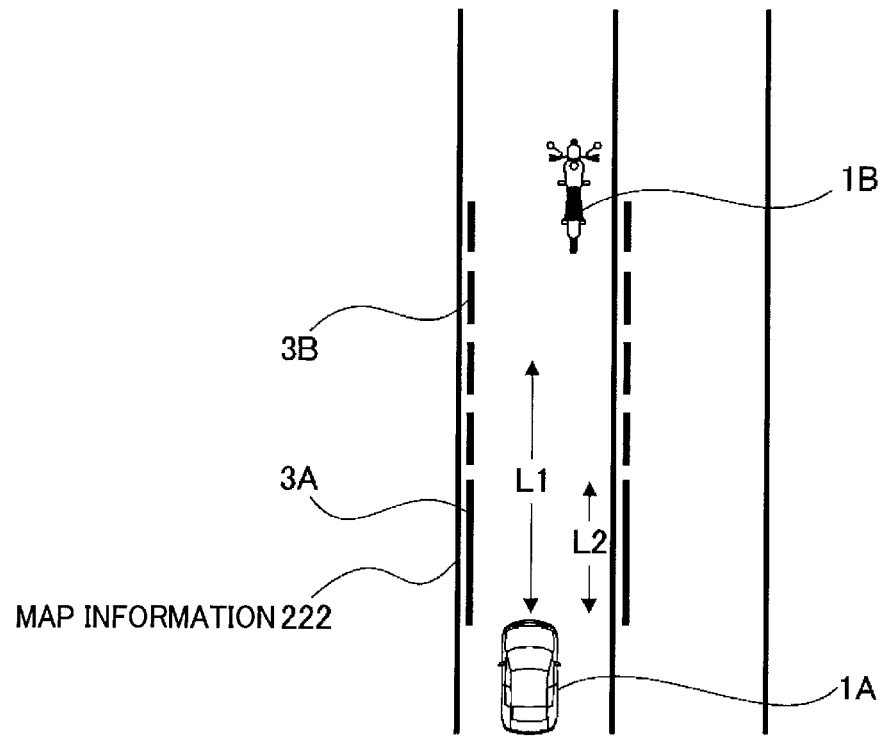
FIG. 11 is an operation explanatory view giving an example of the case where the driving assistance apparatus in Embodiment 3 causes the host vehicle to travel along a straight interpolated route on a road with one lane on each side in which the preceding vehicle is a two-wheeler.
Figure 12:
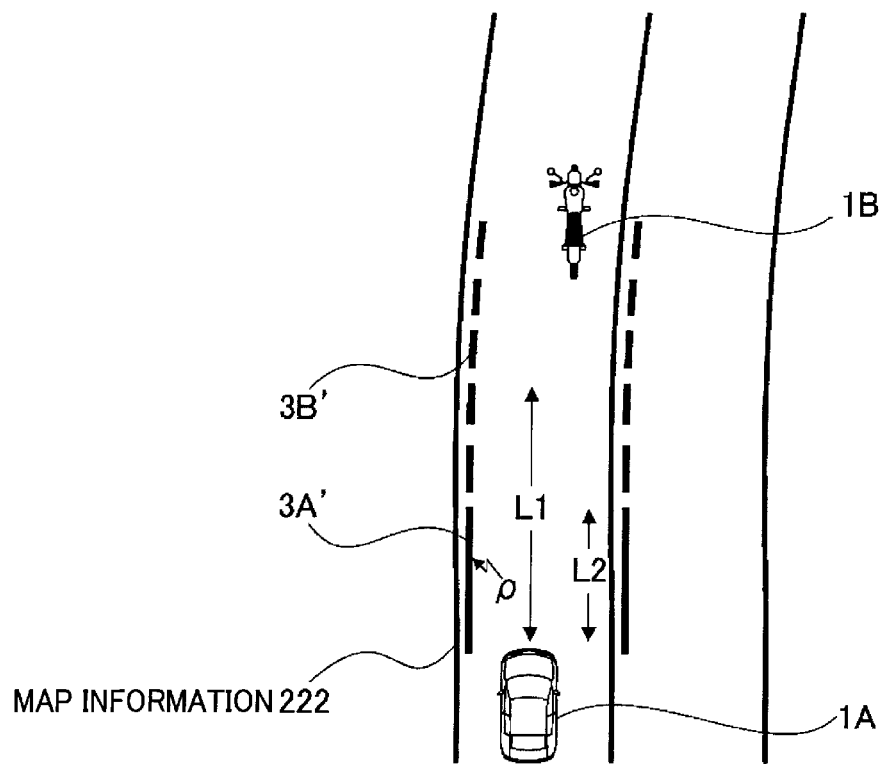
FIG. 12 is an operation explanatory view giving an example of the case where the driving assistance apparatus in Embodiment 3 causes the host vehicle to travel along a curved interpolated route on a road with one lane on each side in which the preceding vehicle is a two-wheeler.

The interpolated lane following processor 500 recognizes a lane in which the host vehicle travels by using white line information or road boundary information recognized by using a stereo camera, a LIDAR, or a RADER. In Embodiment 3, as illustrated in FIGS. 11 and 12, lanes 3A, 3A' are detected. Then, when the length L2 of each of the recognized lanes 3A, 3A' is smaller than forward observing distance L1, the lane 3A, 3A' is interpolated. For example, as illustrated in FIG. 11, the planned traveling route is extended in a straight line in a portion from the terminal end of the lane 3A to the position of the preceding vehicle (two-wheeler 1B) and this extended route is set as an interpolated lane 3B. Moreover, as illustrated in FIG. 12, a curvature p at the terminal end of the lane 3A' is obtained, the planned traveling route is extended in a curved line with the curvature p to the position of the preceding vehicle (two-wheeler 1B), and this extended route is set as an interpolated lane 3B'. Then, control processing of traveling the inside of the interpolated lane 3B, 3B' is performed. Although not described in detail, for example, a lane following method known at the time of filing can be used.

Driving Assistance Control Processing Configuration

Figure 10:
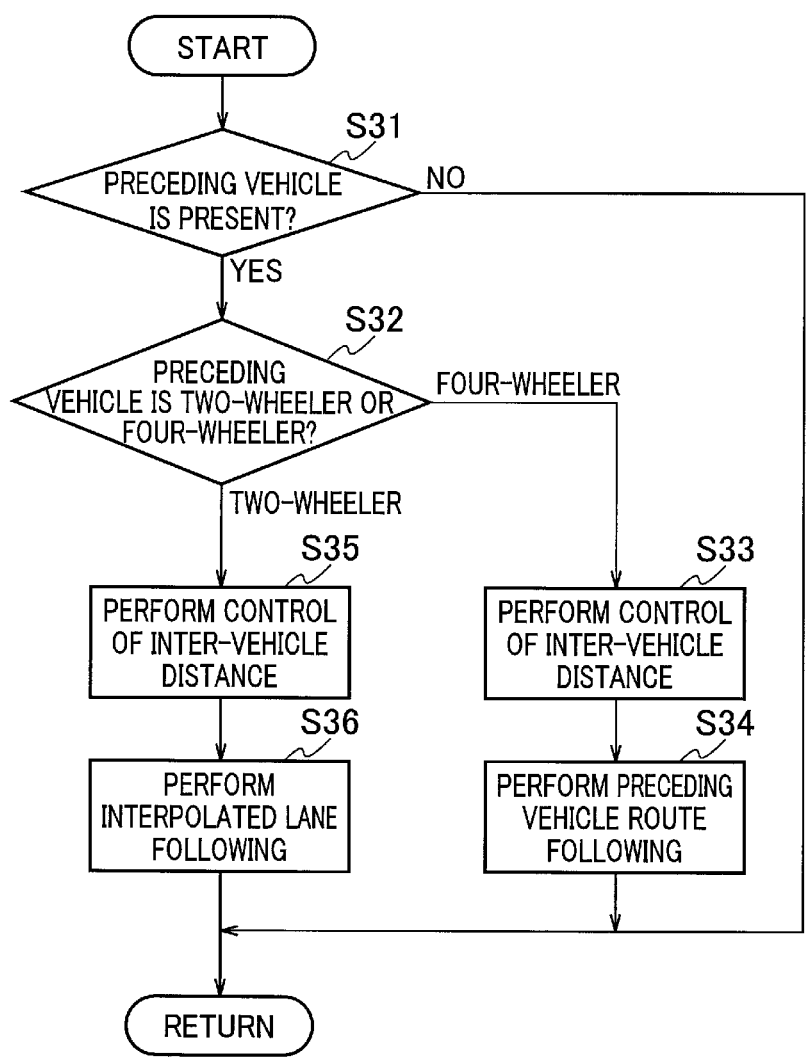
FIG. 10 is a flowchart illustrating a driving assistance control processing flow executed by the processor of the driving planning device included in the driving assistance apparatus of Embodiment 3.

FIG. 10 illustrates a driving assistance control processing flow executed by the processor 11 of the driving planning device 10 included in the driving assistance apparatus 100 of Embodiment 3. Steps of FIG. 10 indicating the driving assistance control processing configuration are described below.

In step S31, the processor 11 determines whether a preceding vehicle is present or absent. In the case of YES (preceding vehicle is present), the flow proceeds to step S32. In the case of NO (preceding vehicle is absent), the flow proceeds to return.

In step S32, following the determination that a preceding vehicle is present in step S31, the processor 11 determines whether the preceding vehicle is a two-wheeler or a four-wheeler. When the preceding vehicle is a four-wheeler, the flow proceeds to step S33. When the preceding vehicle is a two-wheeler, the flow proceeds to step S35.

In step S33, following the determination that the preceding vehicle is a four-wheeler in step S32, the processor 11 performs the control of inter-vehicle distance to the preceding vehicle (four-wheeler) and the flow proceeds to step S34.

In step S34, following the control of inter-vehicle distance in step S33, the processor 11 performs the preceding vehicle route following based on the preceding vehicle (four-wheeler) and the flow proceeds to return.

In step S35, following the determination that the preceding vehicle is a two-wheeler in step S32, the processor 11 performs the control of inter-vehicle distance between the host vehicle and the two-wheeler and the flow proceeds to step S36.

In step S36, following the control of inter-vehicle distance in step S35, the processor 11 performs the interpolated lane following of following the interpolated lane generated based on the planned traveling route obtained from the result of the lane recognition and the flow proceeds to return.

Next, the driving assistance control operation of Embodiment 3 is described.

The driving assistance control operation is described below based on FIGS. 10 to 12.

When the preceding vehicle of the host vehicle is a four-wheeler, in the flowchart of FIG. 10, a flow from step S31 to step S32, to step S33, to step S34, and then to return is repeated. Specifically, the control of inter-vehicle distance is performed in step S33 and the preceding vehicle route following is performed in step S34. As described above, when the preceding vehicle is a four-wheeler, the route following based on the four-wheeler which is the preceding vehicle and the control of inter-vehicle distance to the four-wheeler are performed.

When the preceding vehicle of the host vehicle is a two-wheeler, in the flowchart of FIG. 10, a flow from step S31 to step S32, to step S35, to step S36, and then to return is repeated. Specifically, the control of inter-vehicle distance is performed in step S35 and the interpolated lane following is performed in step S36. As described above, when the preceding vehicle of the host vehicle 1A is the two-wheeler 1B, the interpolated lane following of following the interpolated lane 3B, 3B' generated based on the planned traveling route obtained from the result of the lane recognition is performed without the route following based on the two-wheeler 1B which is the preceding vehicle being performed.

In this case, when the preceding vehicle of the host vehicle 1A is the two-wheeler 1B in traveling along a straight road, as illustrated in FIG. 11, the interpolated lane 3B obtained by linear interpolation is used to perform the interpolated lane following of following the interpolated lane 3B. Meanwhile, when the preceding vehicle of the host vehicle 1A is the two-wheeler 1B in traveling along a curved road, as illustrated in FIG. 12, the interpolated lane 3B' obtained by curve interpolation is used to perform the interpolated lane following of following the interpolated lane 3B'. Note that information on the lanes 3A, 3A in which the host vehicle 1A and the two-wheeler 1B travel is obtained from the map information 222.

As described above, in Embodiment 3, when the preceding vehicle is the two-wheeler 1B with large lateral movement, there are performed the control of inter-vehicle distance to the two-wheeler 1B and the interpolated lane following of following the interpolated lane 3B, 3B' set based on the planned traveling route set in the traveling lane of the host vehicle 1A, without the route following based on the two-wheeler 1B being performed. Accordingly, determining the traveling route of the host vehicle by the interpolated lane following when the preceding vehicle is a two-wheeler and the length L2 of the recognized lane 3A, 3A' is small suppresses lateral movement and makes the behavior of the host vehicle stable.

Next, effects are described.

The effects described below can be obtained by the driving assistance method and the driving assistance apparatus in Embodiment 3.

(5) When the preceding vehicle is a two-wheeler, there are performed the control of inter-vehicle distance to the two-wheeler and the interpolated lane following of following the interpolated lane 3B, 3B' generated based on the planned traveling route obtained from the result of the lane recognition without the route following based on the two-wheeler being performed (FIG. 10).

Accordingly, in addition to the effect (1) or (2) described above, when the preceding vehicle is a two-wheeler and the length of the recognized lane 3A, 3A' is small, determining the traveling route of the host vehicle by the interpolated lane following can suppress lateral movement and make the behavior of the host vehicle stable.

(6) The interpolated lane 3B is generated by linearly extending the planned traveling route obtained from the result of the lane recognition to the position of the two-wheeler 1B which is the preceding vehicle (FIG. 11).

Accordingly, in addition to the effect (5) described above, when the length of the recognized lane 3A is small in a situation where the host vehicle is traveling on a straight road, it is possible to generate the interpolated lane 3B which can make the behavior of the host vehicle stable.

(7) The interpolated lane 3B' is generated by extending the planned traveling route obtained from the result of the lane recognition to the position of the two-wheeler 1B which is the preceding vehicle, according to the curvature p at the terminal end of the planned traveling route (FIG. 12).

Accordingly, in addition to the effect (5) described above, when the length of the recognized lane 3A' is small in a situation where the host vehicle is traveling on a curved road, it is possible to generate the interpolated lane 3B' which can make the behavior of the host vehicle stable.

The driving assistance method and the driving assistance apparatus of the disclosure have been described above based on Embodiments 1 to 3. However, specific configurations are not limited to these embodiments and design changes and additions can be made as long as they do not depart from the spirit of the invention according to the claims in the scope of claims.

In Embodiments 1 to 3, the system including the driving assistance apparatus 100 and the in-vehicle apparatus 200 is described as an example of the driving assistance system 1. However, the driving assistance system is not limited to the system in Embodiments 1 to 3 and part of the functions can be applied to a portable terminal device which can exchange the in-vehicle apparatus information. Note that terminal device includes devices such as a smartphone and a PDA.

In Embodiment 1, there is described the example in which, when the preceding vehicle is a two-wheeler, the route following based on the two-wheeler is basically not performed. In Embodiment 2, there is described the example in which, when the preceding vehicle is a two-wheeler, the lane following is performed. Moreover, in Embodiment 3, there is described the example in which, when the preceding vehicle is a two-wheeler, the interpolated lane following is performed. However, in Embodiments 2 and 3, for example, when the preceding vehicle is a two-wheeler and the pre-preceding vehicle is a four-wheeler, the pre-preceding vehicle route following of following the route of the four-wheeler which is the pre-preceding vehicle may be performed as in Embodiment 1.

In Embodiment 1, there is described the example in which the driving assistance method and the driving assistance apparatus of the disclosure are applied to an automatic driving vehicle with the driving assistance system which automatically controls steering/driving/braking based on the selection of the automatic driving mode. However, the driving assistance method and the driving assistance apparatus of the disclosure can be applied to a driving assistance vehicle which can at least follow the lateral position of the preceding vehicle.

The invention claimed is:

1. A driving assistance method of causing a host vehicle to travel by following a preceding vehicle, the driving assistance method comprising:
    determining whether the preceding vehicle of the host vehicle is present or absent and, upon determining that the preceding vehicle is present, performing a preceding vehicle type determination of determining whether the preceding vehicle of the host vehicle is a four-wheeler or a two-wheeler;
    upon the preceding vehicle being a four-wheeler, performing both a control of inter-vehicle distance to the four-wheeler and a route following based on the four-wheeler; and
    upon the preceding vehicle being a two-wheeler, performing a control of inter-vehicle distance to the two-wheeler without performing a route following based on the two-wheeler.

2. The driving assistance method according to claim 1, comprising:
    determining whether a pre-preceding vehicle of the host vehicle is present or absent and, upon determining that the pre-preceding vehicle is present, performing a pre-preceding vehicle type determination of determining whether the pre-preceding vehicle of the host vehicle is a four-wheeler or a two-wheeler; and
    upon the preceding vehicle being a two-wheeler and the pre-preceding vehicle being a four-wheeler, performing a pre-preceding vehicle route following of following a route of the four-wheeler which is the pre-preceding vehicle, without performing the route following based on the two-wheeler.

3. The driving assistance method according to claim 1, comprising, upon the preceding vehicle being a two-wheeler, performing the control of inter-vehicle distance to the two-wheeler and a lane following of following a planned traveling route obtained from a result of lane recognition without performing the route following based on the two-wheeler.

4. The driving assistance method according to claim 1, comprising, upon the preceding vehicle being a two-wheeler, performing the control of inter-vehicle distance to the two-wheeler and an interpolated lane following of following an interpolated lane generated based on a position of the preceding vehicle and a planned traveling route obtained from a result of lane recognition, without performing the route following based on the two-wheeler.

5. The driving assistance method according to claim 4, wherein the interpolated lane is generated by linearly extending the planned traveling route obtained from the result of the lane recognition from a terminal end of the planned traveling route to the position of the two-wheeler which is the preceding vehicle.

6. The driving assistance method according to claim 4, wherein the interpolated lane is generated by extending the planned traveling route obtained from the result of the lane recognition to the position of the two-wheeler which is the preceding vehicle according to a curvature at a terminal end of the planned traveling route.

7. A driving assistance apparatus comprising a processor configured to perform a control of inter-vehicle distance between a host vehicle and a preceding vehicle and a control of a route following based on the preceding vehicle, wherein the processor is configured to:
    determine whether the preceding vehicle of the host vehicle is present or absent and, upon determination that the preceding vehicle is present, perform a preceding vehicle type determination of determining whether the preceding vehicle of the host vehicle is a four-wheeler or a two-wheeler;
    upon the preceding vehicle being a four-wheeler, perform both a control of inter-vehicle distance to the four-wheeler and a route following based on the four-wheeler; and
    upon the preceding vehicle being a two-wheeler, perform a control of inter-vehicle distance to the two-wheeler without performing a route following based on the two-wheeler.

* * * * *